United States Patent [19]

Dony et al.

[11] Patent Number: 4,895,472

[45] Date of Patent: Jan. 23, 1990

[54] DISASSEMBLABLE BALL AND SOCKET JOINT

[75] Inventors: Dominique Dony, Braillans; Jacky Humblot, Besancon, both of France

[73] Assignee: Airax, France

[21] Appl. No.: 169,945

[22] Filed: Mar. 18, 1988

[30] Foreign Application Priority Data

Apr. 1, 1987 [FR] France ............................ 87 04547

[51] Int. Cl.⁴ ..................... F16C 11/10; F16C 11/06
[52] U.S. Cl. ................................. 403/133; 403/135; 403/143; 403/315
[58] Field of Search ............... 403/70, 71, 77, 122, 403/133, 135, 143, 315

[56] References Cited

U.S. PATENT DOCUMENTS

| | | | |
|---|---|---|---|
| 4,601,603 | 7/1986 | Nakayama | 403/143 |
| 4,720,205 | 1/1988 | Ito | 403/135 |

OTHER PUBLICATIONS

Fontana, Mars, *Corrosion Engineering*, 1986, pp. 295–296.

*Primary Examiner*—Randolph A. Reese
*Assistant Examiner*—Arlen L. Olsen
*Attorney, Agent, or Firm*—Stevens, Davis, Miller & Mosher

[57] ABSTRACT

The invention relates to a disassemblable ball and socket joint, of the type positioned by a single operation. The ball carried by a journal enters a hemispherical housing of the ball cage, a C-shaped retaining ring partly surrounds the cage and penetrates its wall through two slots which lead into the introduction channel of the ball into its housing, converging outwards. To avoid corrosion risks and to facilitate disassembly, the ring exerts upon the cage a force parallel to the axis of the channel at two points located on either side of the plane of symmetry in the summital region, and it also urges the interior face of the slots, by virtue of protuberances provided near its ends, for example, so that it is not normally in contact with the ball or its journal.

20 Claims, 3 Drawing Sheets

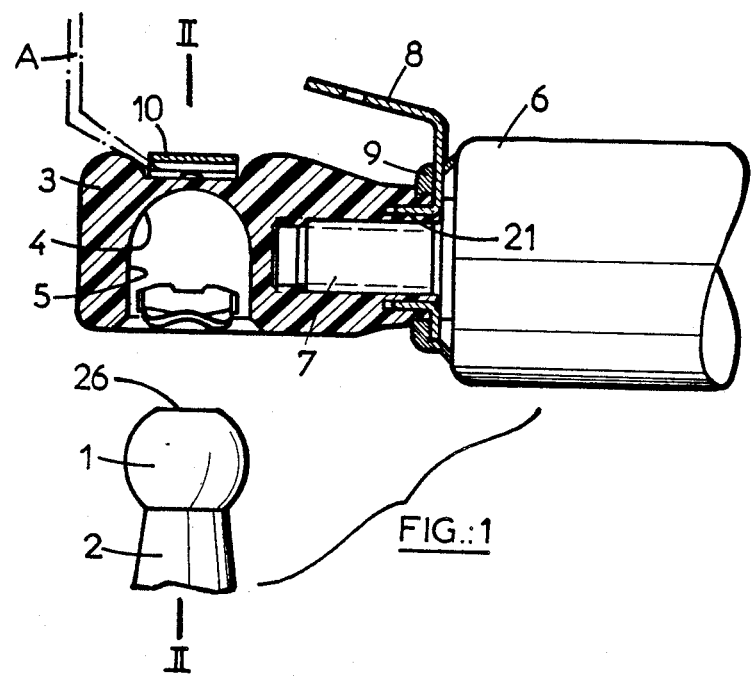
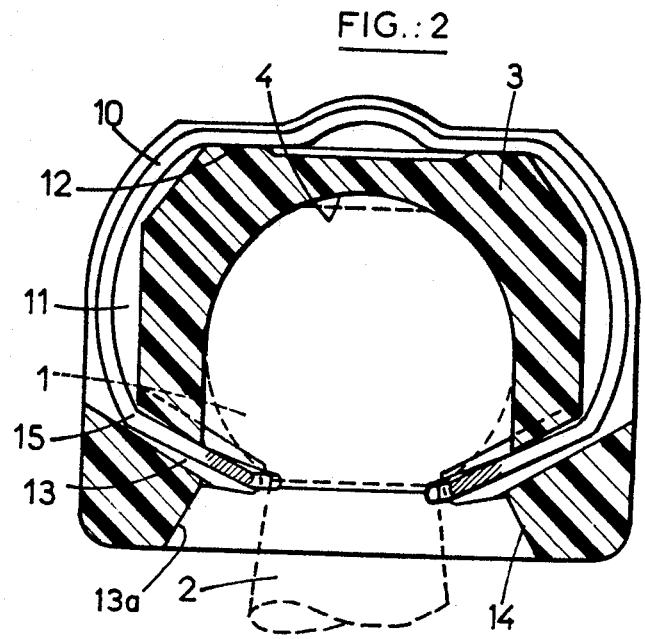
FIG.:1
FIG.:2

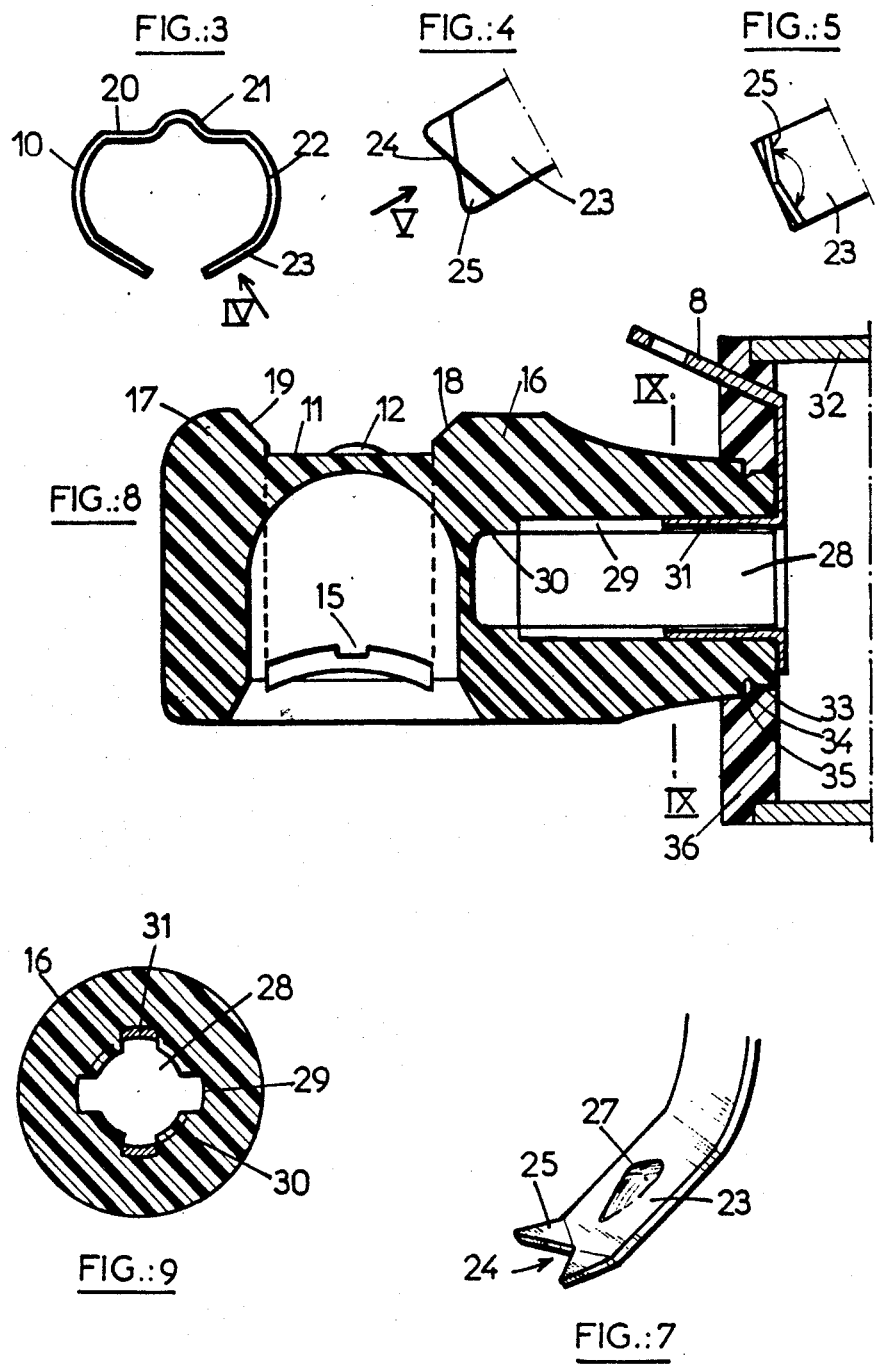

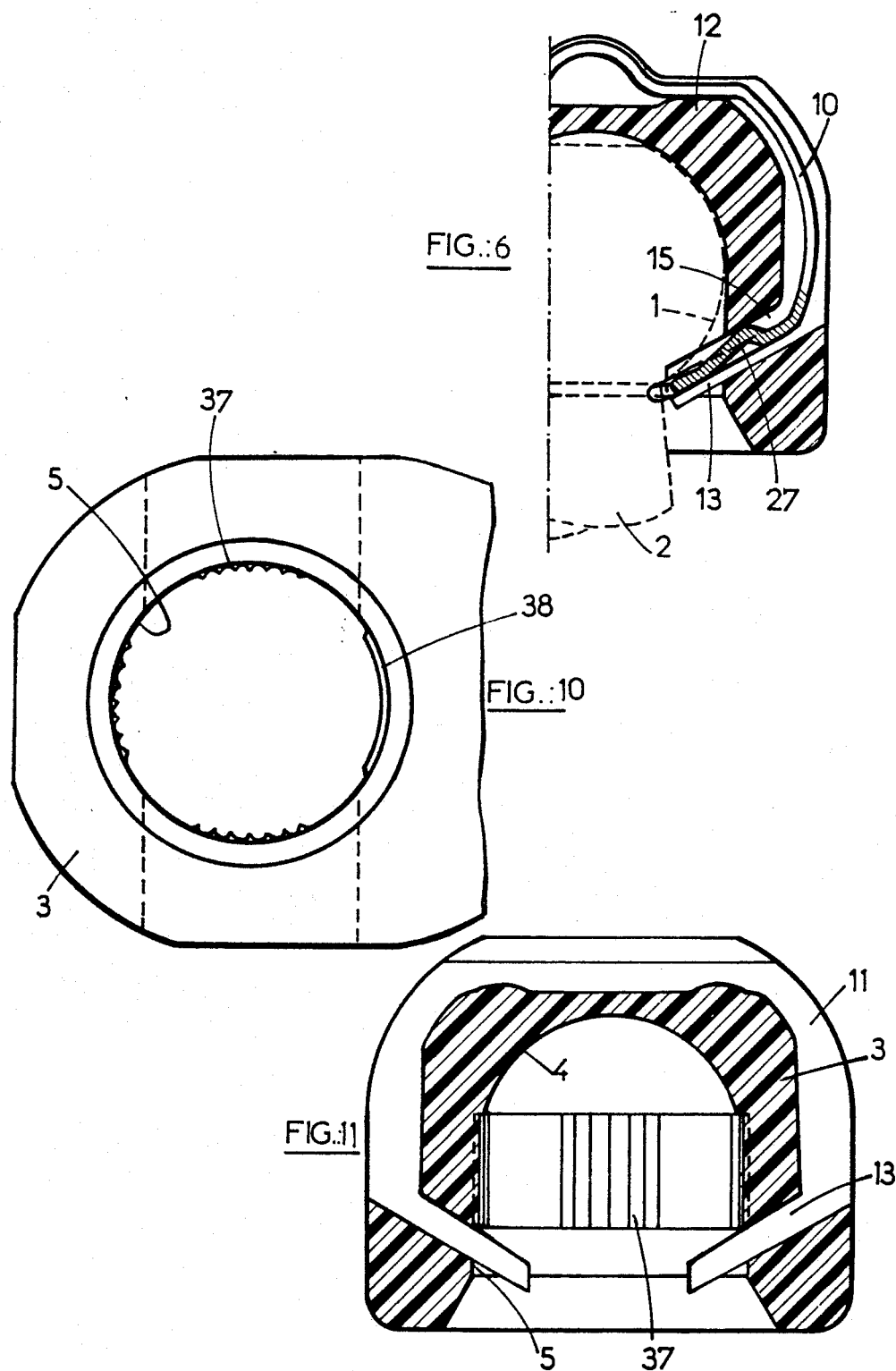

DISASSEMBLABLE BALL AND SOCKET JOINT

BACKGROUND OF THE INVENTION

The invention relates to a disassemblable ball and socket joint, useful particularly for connecting a compressed gas spring to a support element.

In motor vehicles, the compressed gas springs used to balance the movable shutters such as hood, trunk or tailgate door are connected most frequently to the vehicle body by means of ball and socket joints. This joint generally consists of two parts: a steel ball integral with the body and with the shutter, and a plastic or metal cage integral with the compressed gas spring.

The compressed gas springs are frequently fitted in the gutters located on each side of the tailgate; they are exposed to bad weather, and hence to corrosion, particularly at the base of the cage which is fitted on the end of the tube, because water may be retained in that region.

On the other hand, production efficiency dictates a wish to use joints which can be fitted extremely rapidly, preferably in a single operation, this comprising both the positioning of the cage on the ball and the placing of the locking means in the active position. This excludes joints of the old type, where it is necessary to work in two stages: first of all place the ring on the ball by a movement parallel to the axis of the journal which carries the ball, then move the locking means in a different direction, by sliding them perpendicular to the journal for example.

GB No. A-323,976 patent to Bolton describes a ball and socket joint of a different type. Like the others, this ball and socket joint comprises on the one hand a spherical ball integral with a journal, and on the other hand a cage having a cavity adapted to receive the ball substantially without play and connected to the exterior by a cylindrical channel of the same diameter, said cage being further provided with fixing means to a support. The special feature of the joint of this patent is that it is provided with a generally C-shaped resilient ring, the body of which surrounds said cage, passing beyond the base of the cavity, and the ends of which enter two slots of the cage arranged on either side of the channel, of constant width and leading into the channel to permit the ends of the ring to project inside the channel and to retain the ball in the cavity, said slots being oblique relative to the axis of the channel and receding from the center of the cavity in approaching said axis. It follows from this arrangement that a force tending to remove the ball from its housing produces a wedging effect of the ends of the ring in their slots, which effectively resists the exit of the ball.

The above-mentioned GB No. A-323,976 provides for the use, for the purpose of assembly, of a small tongue-shaped tool supplied with the cage and placed between the outside of the latter and the ring, near the outer end of a slot. By pivoting this tool, the end of the ring is moved away from the axis of the channel. The assembly therefore comprises three operations: retracting the ends of the ring, introducing the ball into the cage, releasing the ring. However, it is conceivable that, by a judicious choice of the shape and of the angle of the ends of the ring, the latter might be separated by the ball itself, so that the assembly would be performed in a single operation. However, the tongue-shaped tool would still remain necessary for the dis-assembly, and there would be a risk of finding this dis-assembly impossible if, due to insufficient lateral accessibility, it were possible to effect the positioning by a simple relative movement of the cage and of the ball without being able to activate the tool afterwards. The device of this document also presents a corrosion risk at the point where the ring is constantly in contact with the ball, because wear removes the protection at the contact position.

The modifications which have to be made to the cage of the device of GB No. A-323,976 in order to permit assembly in a single operation evidently present a multiplicity of problems. If the angle formed by the ends of the ring with the axis of the channel approaches a right angle, according to the mutual separation of said ends, it is possible to have either easy assembly but lack of effective locking, or else impossibility of assembly, or risk of straining the ring, but highly effective locking. If the shape of the ring approaches that of an arc of a circle, it is in danger of turning on itself during transport or during handling prior to assembly, and obstructing the channel, which renders the assembly impossible.

The same inconvenient result may occur at the time of assembly if, due to an irregularity, the ball pushes one of the ends of the ring without being in contact with the other; this then causes the ring to rotate upon itself. It should also be observed that, very frequently, the balls exhibit a flat at their summit in order to permit fixing of the journal to a support by riveting. As a result of this, the tolerances on the position of the ends of the ring are close. It therefore appears necessary to anchor the ring firmly relative to the cage in order to prevent it rotating.

Another disadvantage of ring shapes too close to that of an arc of a circle is that they compel the provision of wide slots, particularly on the side of their outer end, in order to permit easy positioning of the ring. Excessively wide slots reduce the mechanical strength of the cage. On the other hand, extremely narrow slots, although they may facilitate the solution of the problem of rotation of the ring, are difficult to obtain.

SUMMARY OF THE INVENTION

The object of the invention is to avoid these various disadvantages and to provide a ball and socket joint, the assembly of which, in a single operation, involves a minimum of accident risks, and which is nevertheless simple and easy to obtain.

The invention therefore provides a disassemblable ball and socket joint, comprising on the one hand a spherical ball integral with a journal, and on the other hand a cage having a cavity adapted to receive the ball, connected to the exterior by a channel to permit the introduction of the ball, said cage further being provided with fixing means to a support, and a generally C-shaped resilient ring, the body of which surrounds said cage, and the ends of which enter two slots in the cage, said slots being arranged on either side of said channel and leading thereinto to permit the ends of the ring to project inside the channel and to retain the ball in the cavity, said slots being oblique relative to the axis of the channel and receding from the center of the cavity in approaching said axis, said joint having the special feature that, when the ball is absent, the ring exerts on the one hand upon the cage a compressive force approximately parallel to the axis of the channel at two points located on either side of the latter and remote from said axis, and on the other hand exerts other compressive forces upon the interior face of the slot by means of two protuberances convex towards the interior of the ring, and formed thereon, or by a bulge provided on said interior face of the slot, and when the ball is in the cavity, the journal being coaxial with the channel, the ring is not in contact either with the ball or with the journal and occupies the same position as when the ball is absent.

The term, "interior face" of a slot is understood to mean the one which is nearer to the center of the cavity.

By virtue of the geometrical arrangement indicated, a high torque resists the rotation of the ring upon itself, both before assembly and during the latter.

Furthermore, the disassembly may be effected by introducing a tool between the ring and the cage in the region of their summit, where the bearing points just mentioned are not located.

The two measures proposed alternatively for the slots and the ends of the ring permit the same results to be obtained: a slot neither too wide nor too narrow, therefore not weakening the cage unduly but easy to obtain, and an approximately central bearing of the end part of the ring upon the interior face of the slot, in order to prevent possible torsion of the ring by the effect of a speck of dust, for example.

Furthermore, all risk of corrosion by contact of the ring with the ball or its journal is prevented, together with the noise caused by the movements of the ring relative to the cage. The wear of the latter in contact with the ring is likewise reduced.

The two measures indicated above, namely the protuberances provided on the ring and the rib on the interior face of the slot, both have the effect of achieving strict positioning of the ends of the ring with a slot width which is compatible with easy production of the cage by molding. The use of the protuberances demands a complementary molding of the ring, whereas the rib of the slot makes the molding of the cage slightly more difficult. The choice is a matter of opportunity, since the forming of the steel and the molding of plastics are frequently performed in different places.

The cage preferably exhibits a circumferential groove wherein that part of the ring which is outside the slots is housed, said bearing points of the ring upon the cage being located at the base of said groove, and the slots leading to the base of said groove, and in the region of the exterior face of the cage which carries said bearing points, the base of the groove is advantageously approximately flat and perpendicular to the axis of the channel, with the possible exception of protuberances constituting said bearing points.

According to advantageous measures:
the exterior face of the cage has at least one protuberance adjacent to the groove, exhibiting on the groove side an oblique face to serve as a bearing point for a tool to lift the ring,
the ring exhibits, in its central region, a part with inward facing concavity, of greater curvature than the ring generally, and the central region of the ring on either side of the strongly curved part is preferably substantially planar, - the end parts of the ring are substantially straight and terminate in a re-entrant angle, and the regions located on each side of said angle are folded inwards.

Further advantageous features which will now be described are preferably associated with the measures of the invention in order to obtain a joint with optimum performance. However, it should be noted that these features may optionally be associated with other types of ball and socket joint.

In case a ball and socket joint comprises a cage having a cavity which receives the ball with some play, and where said cage exerts permanently upon the ball a force perpendicular to the direction of the entrance channel of the ball, which is the case where the joint is connected to a compressed gas spring, it is advantageous to provide that:

a recess is formed in the cage in proximity of the region where said force urges the wall of the cavity against the ball and the base of said recess leads into the cavity, or is at a distance from said cavity which is calculated so that the wall of the cavity is deformed in contact with the ball by the effect of said force, so that the radius of the wall in that zone becomes equal to that of the ball without play, which avoids any play in a different direction from that of the force and maintains the ball in a fixed position. The material of the cage is advantageously more deformable than that of the ball, and the recess does not lead into the cavity. Advantageously again, the recess is constituted by the base of a fixing hole of the cage on a support.

This measure is advantageous in the motor vehicle industry, for which the ball cage described is particularly intended, because it is frequently necessary to provide some play in the cavity in order to compensate the irregularities resulting, for example, from the fact that the ball carries a layer of paint, the thickness of which cannot be guaranteed with extreme precision.

Another measure, which answers the same need, consists in providing that, the cage being preferably of a more deformable material than the ball, the cavity and/or the channel exhibit, compared to their spherical or cylindrical theoretical surface, irregularities constituting grooves and/or ribs, which permit adaptation to the variations in the diameter of the ball by local deformation of said irregularities, and/or which likewise permit the formation of reserves of lubricant.

Said irregularities preferably result from the fact that the channel and/or the cavity have a convex polygonal cross-section.

If the ball and socket joint is subjected to a permanent force perpendicular to the direction of the channel, or forming a large angle with said direction, it is preferable to provide that the irregularities are absent from the region where said force urges the wall of the cavity against the ball.

Two other advantageous measures relate to the solution of problems which are frequently encountered in the motor vehicle industry.

The first of these problems relates to the protection of the connecting region between the ball cage and a compressed gas spring which carries it. It is a question of either preventing corrosion in this region, or of preventing the possibility of the user coming into contact with a rod of the compressed gas spring, which always carries a small quantity of lubricant.

In this case it is advantageously provided that the ball cage exhibits, at its fixing end, a groove and a shoulder which serve as housing and as stop for a cold deformable or hot deformable sealing or protecting part, said part coming to bear against the body of the compressed gas spring, or supporting a sleeve protecting the rod of the compressed gas spring.

Another problem frequently encountered is that of transmitting electricity to an electrically conductive support, such as a compressed gas spring. The customary metallic lugs, which are fitted to the end of the ball cage, provide an appropriate electrical contact with the support only if the latter is screwed fully home in the housing and comes to bear on the ball cage. Any slackening produces an unreliable contact.

In order to solve this problem a self-tapping hole exhibiting longitudinal grooves is provided in the ball cage, and a conductive claw electrically integral with the lug is housed in at least one of said grooves, and preferably in two grooves arranged symmetrically relative to the axis. The compressed gas spring, or any other appropriate part, is screwed in by self-tapping, the screw-threads of the male part gripping into the projecting parts between the grooves of the hole, and likewise gripping partly into the conductive claw, which has at least the effect of eliminating the residue of paint, and of effecting good electrical contact even when the parts are not screwed fully home.

BRIEF DESCRIPTION OF THE DRAWINGS

Other measures and advantages of the invention will appear from the description given below, relating to two practical examples of construction and illustrated by means of the drawings, wherein:

FIG. 1 is a view in elevation and in partial section of a joint according to the invention, before the positioning of the ball in its housing, FIG. 2 is a larger scale section along the line II—II of FIG. 1, the ball being in position in its housing, FIG. 3 is a view in side elevation of the ring, FIGS. 4 and 5 are views of an end of the ring, according to the arrows IV and V in FIG. 3, FIG. 6 is a half-section similar to FIG. 2, showing a variant, FIG. 7 is a view in perspective of an end of the ring, FIG. 8 is a view in section of a variant of the ball cage, the ball and the ring being removed, FIG. 9 is a section along the line IX—IX of FIG. 8, FIGS. 10 and 11 are a bottom plan and a sectional view of the cage, showing a particular measure.

DETAILED DESCRIPTION OF THE PREFERRED EMBODIMENT

FIG. 1 shows a joint comprising on the one hand a ball 1, carried by a journal 2, of conventional type. The shapes and dimensions of these balls and rods are standardized, particularly for motor vehicle designers. The joint further comprises a ball cage 3 which exhibits a cavity 4, hemispherical in shape, intended to receive the ball, and leading outside by a channel 5 of the same diameter.

The ball cage 3 is further provided with fixing means to a support, which may be a compressed gas spring 6, shown only partially in the figure. In the case illustrated, said means consist of a tapped hole 7, the axis of which is perpendicular to that of channel 5 and which intersects the latter in the geometric center of the hemispherical housing 4, although this is not essential. Instead of the tapped hole 7, a self-tapping housing may be provided as will be seen later, or again another fixing means. The reference numeral 8 designates an electrical contact lug fitted on the end of the cage and anchored by means of claws which enter holes provided around the fixing hole 7, and associated with a cap 9, intended to protect the contact between the compressed gas spring 6 and the ball cage, and also the end of the compressed gas spring itself, from corrosion.

The ball cage is made of molded plastic.

A C-shaped resilient ring 10 partly surrounds the ball cage 3 in proximity of the housing 4. It will be described more precisely below.

The body of the ball cage has a groove 11 on its exterior surface in the region of the housing 4. Said groove extends over slightly more than 180° of the circumference of the cage, starting from the end of a slot 13, passing above the end of the housing 4, and returning on the other side of the cage to cease at the end of the other slot 13. In the summital part, that is to say the part opposite the aperture of the channel 5, the base of the groove is substantially planar, that is to say perpendicular to the axis of the channel 5, but with two bearing points 12, visible in FIGS. 2 and 6, which project upon the base of the groove. The groove 11 communicates at each of its ends with a slot 13 of constant cross-section throughout its length, which penetrates the wall of the ball cage to lead into the channel 5, below the junction of the latter with the housing 4 in proximity of a flared part 13a whereby this channel 5 leads outside. A rib 15 which extends throughout the length of the slot is provided on the interior wall of the slot, that is to say the wall which is on the side of the housing 4. The general direction of the slot 13 forms an angle of approximately 60° with the axis of the housing 5, with the two slots converging towards the axis of the channel 5 towards the outside of the cage, that is to say opposite the housing 4. The interior face of the slot 13, that is to say that which is farther from the housing 4, is substantially planar and is prolonged as far as the exterior surface of the ball cage, constituting the end of the groove 11. Two projections 16 and 17 are provided on the summital face of the ball cage, that is to say on the opposite side to the channel 5, one on the side of the fixing means 7, the other on the opposite side. These projections are adjacent to the groove 11, and they exhibit a descending face, 18-19, inclined at 45° towards said groove.

Referring now to FIG. 3, which shows the resilient ring 10 at rest, it will be seen that it has generally a symmetrical C-shape, with an approximately flat body 20, but provided at its central part with a bulge 21, strongly convex towards the outside of the C. The body 20 is prolonged by two circular arcuate wings 22 which form an angle of approximately 45° with the body 20 and extend over approximately 90°. Said wings 22 are prolonged by end parts 23, which are substantially straight and converge mutually.

FIGS. 4 and 5 show that, in plan, said end parts are terminated by a re-entrant angle 24, and the regions 25 which are on each side of said re-entrant angle are folded slightly inwards.

FIG. 7 shows the same arrangement, but the angles have been exaggerated for better comprehension. Indeed, looking at said end parts end on, as indicated in FIG. 5, it will be seen that they are only folded slightly so as to form a kind of gutter, the concavity of which faces the inside of the ring, and said gutter is not very pronounced, its summit angle is of the order of 160°.

Referring again to FIG. 2, it will be seen that the ring 10, when it is in position on the ball cage 3, bears against the two bearing points 12 and against the two ribs 15, which consequently maintain it under tension, the interval between the end parts 23 therefore being greater than it is at rest. It is important for this interval to be greater than the dimension of a flat 26 which is provided conventionally at the summit of the ball 1. In fact, if this were not so, it would be impossible to introduce the ball into its housing, with the ring in position, in a single operation. Obviously it is a question of the distance between the end parts 23, measured in the median plane of the ring, which is also a median plane for the ball. The re-entrant angle shape 24 of the end parts 23 is in fact adapted to the circular shape of the ball. As may be seen in FIG. 2, the interval between the parts 23 is likewise greater than the diameter of the neck whereby the journal 2 is connected to the ball 1, which permits an angular movement of a few degrees by the journal relative to the ball cage 3, without any contact occurring between the journal 2 and the ring 10. Obviously, the interval between the end parts 23 of the ring is considerably smaller than the diameter of the ball 1 itself, otherwise the latter could escape.

As may be imagined, the ring 10 is made from a steel strip.

FIG. 1 shows at A the position of a tool which would be introduced beneath the strongly convex part 21 of the ring 10 in order to lift the latter so as to release the ball 1. It will be seen that the operation is facilitated by the projections 16 and 17 and their inclined flanks 18–19. It will be observed that the strongly convex part 21 is not absolutely necessary to introduce the tool: for example, it will be sufficient for the lateral edges of the ring to be raised slightly upwards in FIG. 1. However, this arrangement would have the disadvantage of producing an increase in the rigidity of the ring 10. On the contrary, the strongly convex bulge 21 has the effect of appreciably increasing the flexibility of said ring, which is a favorable effect.

FIGS. 6 and 7 relate to the other measure of the present invention, namely that whereby, instead of the ribs 15, a protuberance 27 was provided on the ring. FIG. 6 illustrates a device conforming in all respects to that of FIG. 2, with the sole difference that the rib 15 has been omitted and that, to compensate this, the central region of the end part 23 of the ring 10 has a protuberance 27 with convexity facing the inside of the ring 10, and which comes into contact with the interior face of the slot 13.

As shown best in FIG. 7, the protuberance 27 extends along the axis of the end part 23 of the ring. This arrangement has the effect of increasing the rigidity of the ring in this region, where it is required to serve for locking the ball. As stated above, FIG. 7 shows a deliberately deformed view in order to facilitate comprehension.

In FIGS. 2 and 6 the slots 13 are illustrated with a straight shape. It is possible, while retaining a substantially constant width for them so as not to weaken the cage, to give them an incurved shape which may facilitate the introduction of the ring. They will advantageously have the shape of an arc of a circle, the center of which is in the median plane of the cage. Removal of the cage from the mold will then be effected by pivoting the two halves of the mold about this center.

FIG. 8 illustrates in section a ball cage from which the ball itself and the ring are assumed to have been removed, but which is otherwise equipped with an electrical lug 8 fixed in a different manner from that in FIG. 1.

In fact the ball cage exhibits, instead of a tapped hole 7, a self-tapping hole 28. As may be seen best in FIG. 9, said hole, of circular general cross-sectional shape, exhibits in its wall four wide longitudinal grooves 29 separated by four longitudinal ribs 30. According to the customary technique, when an appropriate screwthreaded male part is screwed into such a hole, the screwthreads of said male part grip in the ribs 30 to effect fixing. In the present case, the electrical lug 8 comprises two claws 31 which are threaded into two diametrically opposite grooves 29, without projecting beyond the ribs 30. When the male screwthreaded part is inserted into the hole 28, its screwthreads grip on the claws 31, but less intensely than in the ribs 30. Good electrical contact is thus effected from the outset of positioning the male part, with possible scaling of the residues of paint, grease, or other non-conductive impurities which might remain on the male part.

In the present case said male part constitutes the end of a piston rod of a compressed gas spring, not shown. The reference numeral 32 refers to the end of a tube protecting said piston rod from undesirable contacts. In order to fix said tube 32 to the ball cage effectively, the latter has at its end a recessed cylindrical part 33 which ends in a throat 34 adjacent to the shoulder 35 of the body of the ball cage. The throat 34 and the shoulder 35 serve respectively as hooking and stop regions for a disk 36, made of flexible material such as rubber, which is threaded on the one hand onto the ball cage, and on the other hand into the tube 32. An effective, durable and fluidtight fixing is ensured by this means. This fixing means is the same as that which is used for the joint 9, visible in FIG. 1, and which permits fluidtightness and protection from corrosion to be obtained directly between the ball cage and the body 6 of a compressed gas spring.

It will be observed that the base of the hole 28 moves forward into proximity with the cavity 4 which acts as a housing for the ball, so that only a thin disk remains between said cavity and the base of the hole 28. This deliberate arrangement has the following result: since the compressed gas spring exerts permanently upon the ball cage an action tending to thrust the wall of the cavity against the ball in a direction perpendicular to the axis of the channel 5, the plastic material of which the ball cage is made is deformed to espouse the shape of the ball. A permanent fixed contact is thus obtained between the ball and its cage, even if the cavity has been provided with a slightly greater diameter than the nominal diameter of the ball, so as to compensate possible irregularities due particularly to the presence of paint.

Obviously, it would be possible to omit the disk and to obtain a similar result by deforming only the edges of the region where the hole 28 would lead into the cavity 4; however, it should be observed that in this situation the protection of the end of the compressed gas spring from corrosion will be less satisfactory.

FIG. 11 shows a ball cage which is highly similar to that of FIG. 6, apart from the presence, in the channel 5 and in the adjacent part of the cavity 4, of a series of bulges 37 parallel to the axis of the channel 5. Said bulges 37, the shape of which is shown most clearly in FIG. 10, serve to obtain a similar result to that which is obtained by the disk located at the bottom of the hole 28, which was mentioned earlier, namely to compensate the inevitable variations in the diameter of the ball. The bulges 37 have another purpose, because the voids which are present between said bulges may serve as reserves of lubricant material. It will be noticed in FIG. 10 that a part 38 of the circumference of the channel 5 comprises no bulges, but on the contrary exhibits a smooth surface. This is the part which is normally urged against the ball by the effect of the permanent force of the compressed gas spring. It will be noted that the two effects produced by the grooves, compensation of the irregularities in diameter and formation of a lubricant reserve, can be obtained with different types of surface irregularities. For example, fairly numerous grooves may be provided with smooth edges, always directed parallel to the axis of the channel 5. The cavity 4 and/or the channel 5 may likewise be given a polygonal shape. The magnitude of the irregularities will be greater or less according to the ratio of the hardness of the material of which the cage is made and the material of which the ball is made.

We claim:

1. A disassemblable ball and socket joint, comprising:
   a spherical ball integral with a journal,
   a cage body having a cavity adapted to receive the ball, a channel in said cage body connected to said cavity to permit the introduction of the ball into the cavity, and two slots one arranged on each side of said channel and leading thereinto, said cage body further being provided with means for fixing it to a support, and
   a generally C-shaped resilient ring, surrounding said cage body, and positioned so that the ends of the resilient ring enter said two slots in the cage body and project inside the channel to retain the ball in the cavity;
   said resilient ring, when the ball is absent, exerting on one hand upon the exterior of the cage body a compressive force approximately parallel to the axis of the channel at two points located on either side of the channel and spaced from said axis, and on the other hand exerting additional compressive forces upon the interior face of the slot by means of two protuberances formed on the interior face of the ring and outwardly convex towards the interior of the ring, or by a rib provided on the interior face of the slot;
   said resilient ring being so shaped and positioned by the cage body that when the ball is in the cavity and the journal is coaxial with the channel, the resilient ring is not in contact either with the ball or with the journal and occupies the same position as when the ball is absent.

2. A joint as claimed in claim 1, wherein the cage body has in its part opposite the channel a region which is substantially planar and perpendicular to the axis of the channel, upon which bearing points of the cage are located.

3. A joint as claimed in claim 2, wherein the cage has a circumferential groove into which the slots lead, and in which that part of the ring which is outside the slots is housed, bearing points of the cage being located at the base of said groove, said groove base comprising said region which is substantially planar and perpendicular to the axis of the channel.

4. A joint as claimed in claim 3, wherein the exterior face of the cage body has at least one projection adjacent to the groove, the groove side having an oblique face to serve as a bearing point for a tool to lift the ring.

5. A joint as claimed in claim 1, wherein the cage has a cavity which receives the ball with some play, and wherein said cage exerts permanently upon the ball a force perpendicular to the direction of the entrance channel of the ball, a recess formed in the cage in proximity of the region where said force urges the wall of the cavity against the ball and the base of said recess is at a distance from the cavity calculated so that the wall of the cavity is deformed in contact with the ball by the effect of said force so that the radius of the wall in said region becomes equal to that of the ball without play.

6. A joint as claimed in claim 5, wherein the material of the cage is more deformable than that of the ball.

7. A joint as claimed in claim 5, wherein the recess is constituted by the base of a fixing hole of the cage on a support.

8. A joint as claimed in claim 1, wherein the cavity and/or the channel have, as compared to their spherical or cylindrical theoretical surface, irregularities constituting grooves and/or bulges which permit adaptation to variations in the diameter of the ball by local deformation of said irregularities, and/or which likewise permit the formation of reserves of lubricant.

9. A joint as claimed in claim 8, wherein said irregularities are due to the fact that the channel and/or the cavity have a convex polygonal cross-section.

10. A joint as claimed in claim 8, which is intended to be subjected to a permanent force perpendicular to the direction of the channel, or forming a large angle with said direction, and the irregularities are absent from the region where said force urges the wall of the cavity against the ball.

11. A joint as claimed in claim 1, wherein the cage body has a circumferential groove into which the slots lead and wherein that part of the ring which is outside the slots is housed, the contact points of the ring upon the cage body being located at the base of said groove.

12. A joint as claimed in claim 11, wherein said groove base includes a region which is substantially planar and perpendicular to the axis of the channel.

13. A joint as claimed in claim 11, wherein the exterior face of the cage body has at least one projection adjacent to the groove, the groove side having an oblique face to serve as a fulcrum point for a tool to lift the ring.

14. A joint as claimed in claim 1, wherein said cavity receives the ball with some play, and said cage exerts permanently upon the ball a force perpendicular to the direction of the entrance channel of the ball, a recess formed in the cage in proximity of the region where said force urges the wall of the cavity against the ball and the base of said recess leads into the cavity, and the wall of the cavity is deformed to be in contact with the ball by the effect of said force so that the radius of the wall in said region becomes equal to that of the ball without play.

15. A joint as claimed in claim 1, wherein the ball cage exhibits at its fixing end a groove and a shoulder which serves as housing and as stop for a cold deformable or, hot deformable sealing or protecting part.

16. A joint as claimed in claim 1, wherein said cage comprises a self-tapping hole having grooves, and at least one electrically conductive claw is driven into a groove to be gripped by a self-tapping male fixing part, said claw being electrically integral with a lug to be connected electrically to a support.

17. A joint as claimed in claim 1, wherein the ring has in its central region a bulge with an inward facing concavity of greater curvature than the ring generally.

18. A joint as claimed in claim 1, wherein the central region of the ring is substantially planar with the exception of a curved central part.

19. A joint as claimed in claim 1, wherein the end parts of the ring are substantially straight and said end parts terminate in a re-entrant angle, and the regions located on each side of said angle are bent inwards.

20. A joint as claimed in claim 1, wherein the slots have a substantially constant cross-section throughout their length.

* * * * *